Aug. 23, 1938.　　L. W. MORTON ET AL　　2,128,162
ELECTRIC CONTROL SYSTEM
Filed Aug. 7, 1936
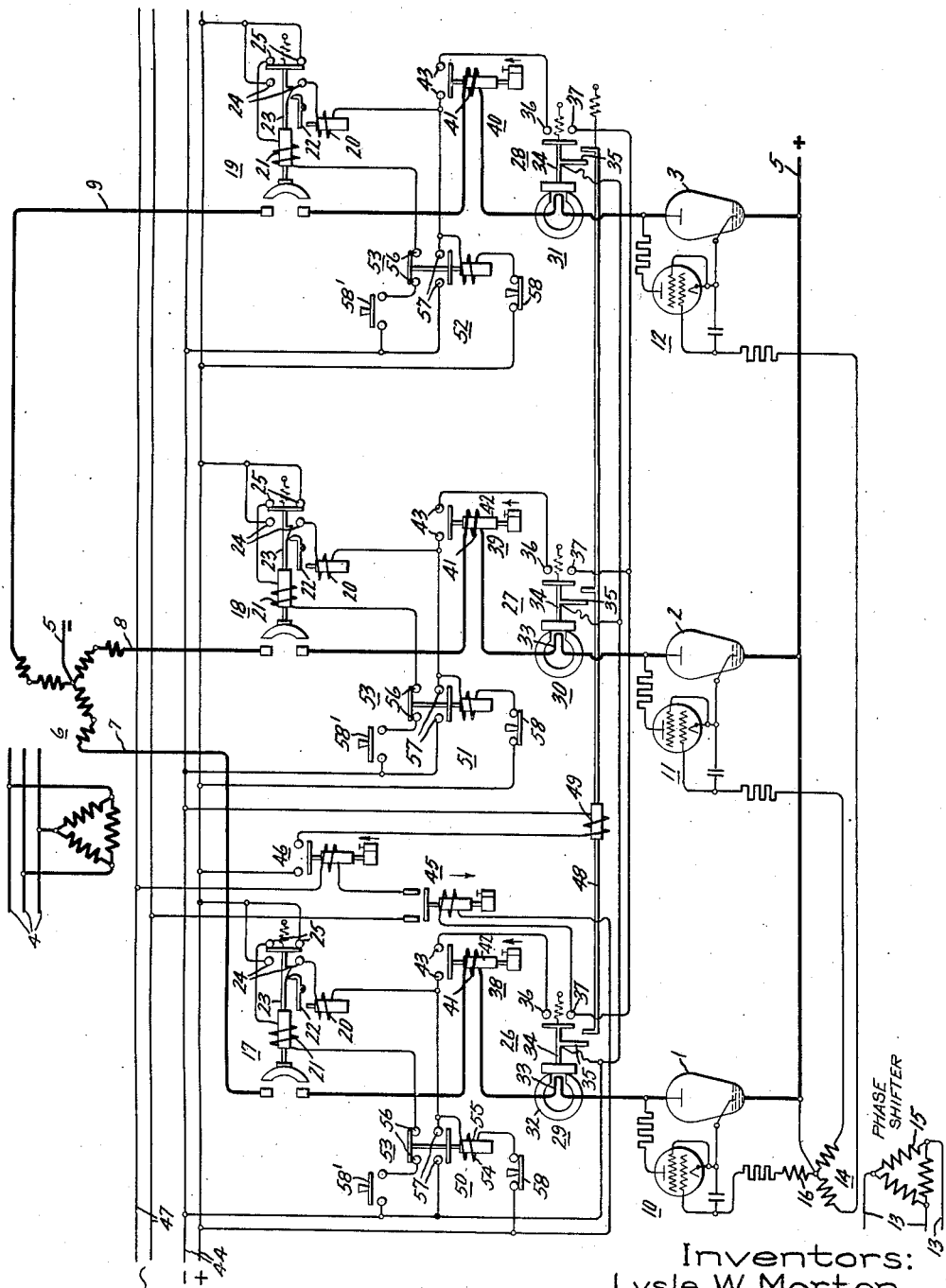
Inventors:
Lysle W. Morton,
Richard G. Lorraine,
by Harry E. Dunham
Their Attorney.

Patented Aug. 23, 1938

2,128,162

UNITED STATES PATENT OFFICE 2,128,162

ELECTRIC CONTROL SYSTEM

Lysle W. Morton, Schenectady, and Richard G. Lorraine, Scotia, N. Y., assignors to General Electric Company, a corporation of New York Application August 7, 1936, Serial No. 94,772

7 Claims. (Cl. 175—363)

Our invention relates to electric control systems and more particularly to control systems for electric circuits employing electric valves.

With the greater application of electric valves to electric translating circuits generally, it has become evident that improved control circuits are highly desirable to provide selective control of the electric valves under various operating conditions. Heretofore, the control circuits for electric valves have been designed to effect rapid interruption of the associated circuits in the event the electric valves have been subjected to an arc-back condition. Where the arc-back condition does not continue for a long interval of time, and where the electric valves are constructed to withstand arc-back conditions of moderate severity, it is frequently preferable to maintain the electric valve circuit in operation rather than sacrifice the continuity of service. Furthermore, it has become apparent that it is highly desirable to provide a control system for electric valve circuits which is automatic in operation under those conditions in which the arc-back condition does not become extremely severe.

It is an object of our invention to provide a new and improved electric control system.

It is another object of our invention to provide a new and improved control system for electric valve circuits.

It is a further object of our invention to provide a control system for electric valve means whereby the associated electric circuit is interrupted only when an arc-back condition is of predetermined severity and is maintained for a predetermined time.

In accordance with the illustrated embodiment of our invention, we provide a new and improved control system for electric circuits generally. The control system as hereinafter described is applied to an electric valve translating system for transmitting energy between an alternating current circuit and a direct current circuit. This control system effects interruption of the circuits associated with the various electric valve means when the electric valve means are subjected to an arc-back condition of predetermined severity and duration. Circuit interrupters are connected in series relation with each of the electric valve means and are provided with trip coils which are energized when the arc-back current of the associated electric valve means obtains for a predetermined interval of time and is of a predetermined magnitude. Each of the control circuits includes a device responsive to the reversal of an electrical condition, such as the reversal of current in the associated electric circuit, and which initiates an operation to effect energization of the trip coil when the electrical condition reverses. There is also provided in each control circuit a time delay relay arranged to complete the operation initiated by the reverse current device after the reversal has obtained for a predetermined interval of time to energize the trip coil of the circuit interrupter and interrupt the flow of current through the associated electric valve means. A reset means is also provided to reset the reverse current devices a predetermined time after the devices have initiated the tripping operation.

For a better understanding of our invention reference may be had to the following description taken in connection with the accompanying drawing and its scope will be pointed out in the appended claims.

Referring now to the single figure of the drawing, our invention is diagrammatically illustrated as applied to an electric valve translating system. A plurality of electric valve means, such as electric valves 1, 2 and 3, preferably of the type employing an ionizable medium such as a gas or vapor, are employed to transmit energy between the alternating current circuit 4 and the direct current circuit 5 through a transformer 6 and associated electric circuits or conductors 7, 8 and 9. While for the purpose of explaining our invention we have chosen to represent the electric valve means 1, 2 and 3 as being of the type each employing a single anode and a cathode within an enclosing receptacle, it should be understood that we may employ other electric valve means, such as those in which a plurality of anodes and a single cathode are enclosed within a receptacle. Excitation circuits 10, 11 and 12 are associated with electric valves 1, 2 and 3 and are employed to render the electric valves conductive during predetermined intervals. The excitation circuits 10, 11 and 12 are energized from any suitable source of alternating potential, such as the source 13, through any conventional phase shifting device 14 which, for the purpose of illustration, is shown as being of the type having a stationary member 15 and a relatively movable member 16.

In order to interrupt the circuits 7, 8 and 9 upon the reversal of a predetermined electrical condition or quantity, such as the reversal of current in the circuits 7, 8 and 9, we employ circuit interrupters 17, 18 and 19 which are connected in series relation with secondary windings of transformer 6 and electric valves 1, 2 and 3, respectively. Each of the circuit interrupters 17 is provided with a trip coil 20, a closing coil 21, a latch member 22, a spring biased armature member 23 and auxiliary contacts 24 and 25.

Control circuits 26, 27 and 28 are associated with electric circuits 7, 8 and 9 and electric valves 1, 2 and 3, respectively, and serve to energize the trip coils 20 of circuit interrupters 17, 18 and 19 when the current through electric valves 1, 2 and 3 reverses direction and is maintained for a predetermined interval of time. In each of control circuits 26, 27 and 28, we provide electro-responsive devices 29, 30 and 31, respectively, each including a permanent magnet 32, a coil 33 for bucking the flux of the permanent magnet 32, a spring biased armature member 34 having an extension 35, and contacts 36 and 37. Included in the control circuits 26, 27 and 28 there are also provided time delay relays 38, 39 and 40, respectively, each having an actuating coil 41, an armature 42 and contacts 43. Relays 38, 39 and 40 are of the type designed to close with a time delay in accordance with the existence of an electrical quantity of predetermined magnitude and duration. By adjusting the setting of relays 38, 39 and 40, circuit interrupters 17, 18 and 19, respectively, may be controlled to open circuits 7, 8 and 9 after the lapse of a predetermined time. For example, the time setting of these relays may be chosen so that the circuit interruption is effected when the arc-back condition continues for a predetermined number of negative half cycles or a fraction of a negative half cycle. These time delay relays, although of the type designed to close with a time delay, are arranged to open the contacts 43 substantially coincidentally with the interruption of the associated circuits 7, 8 and 9 by the circuit interrupters 17, 18 and 19, respectively. The control circuits 26, 27 and 28 are energized from any suitable source of direct current 44 which upon proper actuation of the respective control circuits energize the trip coils 20 of circuit interrupters 17, 18 and 19 under predetermined operating conditions.

It is to be noted that the electroresponsive devices 29, 30 and 31 are merely illustrative of the various types which may be employed to obtain a practically instantaneous response to the initiation of a reverse current condition in the electric circuits 7, 8 and 9. These electroresponsive devices may be of the type disclosed and broadly claimed in a copending application Serial No. 65,293 of Burnice D. Bedford, filed February 24, 1936, and assigned to the assignee of the present application. It is to be noted further that each of the electroresponsive devices 29, 30 and 31 is independently associated with electric circuits 7, 8 and 9, respectively, so that the armature member of each of these electroresponsive devices is arranged to move to the released position independently of the other devices.

To reset the armature members 34 of electroresponsive devices 29, 30 and 31 a predetermined time after the first armature member is released, we provide any conventional time delay arrangement such as the relays 45 and 46. Relay 45 is of the type designed to close its contacts practically instantaneously with the release of armature members 34 of electroresponsive devices 29, 30 and 31. However, this relay 45 opens with a predetermined time delay to assure energization of relay 46 which is designed to close with a time delay. The control circuits 26, 27 and 28 and the relay 45 are energized from the auxiliary source of direct current 44, and the relay 46 may be energized from a suitable auxiliary source of current such as alternating current circuit 47. It is to be noted that although the relay 46 is diagrammatically shown as energized from the alternating current circuit 47, this relay may be of the type designed to be energized from a direct current circuit.

An electro-mechanical arrangement comprising a mechanical actuating bar 48 and an actuating winding 49 is provided to engage the extensions 35 of armature members 34 of electroresponsive devices 29, 30 and 31 to reset those armature members which have been released due to the existence of a reverse current condition in electric circuits 7, 8 and 9. The energization of the actuating coil 49 is effected by means of the relay 46 which connects the coil 49 to the auxiliary source of direct current 44.

To assure positive action of the control of trip coils 20 and closing coils 21 of circuit interrupters 17, 18 and 19, we provide circuits 50, 51 and 52 each including a relay 53 having a holding coil 54, an armature member 55, and contacts 56 and 57. There is also provided in each of the circuits 50, 51 and 52 a switch 58 to interrupt the circuit for holding coil 54, and a switch 58' to effect energization of the closing coil 21.

While our invention has been diagrammatically illustrated as applied to an electric valve translating circuit, it should be understood that our invention is broadly applicable to electric translating circuits generally in which it is desired to control an associated means in a translating circuit when an electrical quantity or condition of the translating circuit experiences a predetermined change which continues for a predetermined time.

For the purpose of explaining the operation of our invention diagrammatically shown in the single figure of the drawing, let it be assumed that the electric valve translating circuit is operating to supply direct current to the circuit 5 through transformer 6 and the associated electric valve means 1, 2 and 3. Furthermore, let it be assumed that the circuit interrupters 17, 18 and 19 are in the circuit closing position so that the armature members 23 are retained in the circuit closing position by the latch members 22 and bridge the auxiliary contacts 24. The armature members 34 of the electroresponsive devices 29, 30 and 31 will be maintained in the positions shown in the drawing by the permanent magnets 32. Relays 38, 46 and 53 will also be considered in the positions shown in the drawing.

If there is a reversal of current in one of the associated electric circuits, for example, circuit 7, the electroresponsive device 29 will operate substantially instantaneously to bridge contacts 36 and 37. This operation of the armature members 34 is obtained by virtue of the reduction in flux due to the coil 33 of electroresponsive device 29. This bridging action of contacts 36 and 37 by armature member 34 initiates an operation tending to energize the trip coil 20 of circuit interrupter 17. By virtue of this movement of the armature member 34, the actuating coil of relay 45 is energized from the direct current source 44 to close the contacts of this relay connecting the actuating coil of relay 46 across the source of alternating current 47. The circuit for energizing the actuating coil of relay 45 includes the positive side of the direct current source 44, the actuating winding of relay 45, contact 37 and armature member 34 of electroresponsive device 29 and the negative side of the direct current source 44. After a predetermined interval of time established by relay 46, the relays 45 and 46 will effect energization of the actuating coil 49 of the reset mechanism from the direct current source 44 to reset the armature member 34. This resetting action is accomplished by the mechanical bar 48 engaging the extension 35 of armature member 34 and moving it to the position shown in the drawing. However, if the reverse current or arc-back condition continues for a predetermined interval of time established by relay 38, the time delay relay 38 will be actuated to bridge the contacts 43 to effect a completion of the operation previously initiated by the electroresponsive device 29. That is, the trip coil 20 of circuit interrupter 17 will be energized from the direct current source 44 to trip the circuit interrupter 17 to the position shown in the dawing. The circuit through which the trip coil 20 is energized includes the positive side of the direct current source 44, contacts 24 of circuit interrupter 17, trip coil 20, contacts 43 of time delay relay 38, contact 36 and armature member 34 of electroresponsive device 29, and the negative side of the direct current source 44. Upon being moved to the open circuit position, the armature member 23 of circuit interrupter 17 will bridge contacts 25 as shown in the drawing. It is to be noted that irrespective of the duration of the arc-back or reverse current condition, the relays 45 and 46 will function to reset the armature member 34 after the lapse of a predetermined interval of time. When the armature member 42 of time delay relay 38 is raised to bridge contacts 43 to energize trip coil 20, it also effects energization of the holding coil 54 of relay 53 in circuit 50. As a result of the energization of coil 54, the armature member 55 of relay 53 is raised to bridge contacts 57, thereby establishing a holding circuit for relay 53 and interrupting the circuit for the closing coil 21 by breaking this circuit at contacts 56.

As stated above, after the lapse of a predetermined time the armature member 34 of electroresponsive device 29 will be automatically reset. In order to assure the resetting operation, the relay 45 is designed to open after a predetermined time. By this action the relay 46 is energized which in turn accomplishes movement of the mechanical member 48. While the relays 45 and 46 have been explained as comprising two separate relays, it should be understood that these relays may be combined in a single device to perform the delayed resetting operation.

When it is desired to re-energize the electric circuit 7, the switch 58 is operated to effect an interruption of the circuit for holding coil 54 of relay 53. As a result, the armature member 55 returns to the position shown in the drawing. Switch 58' is then operated to connect the closing coil 21 of circuit interrupter 17 across the source of direct current 44. This circuit includes the positive side of the direct current source 44, contacts 25 of circuit interrupter 17, closing coil 21, contacts 56 of relay 53, switch 58', and the negative side of direct current source 44. Upon energization of closing coil 21, the armature member 23 of circuit interrupter 17 will be moved to the circuit closing position and will be retained in that position by the latch 22.

As a further feature, it is to be noted that the relays 45 and 46 are controlled by electroresponsive devices 29, 30 and 31. The first of these electroresponsive devices to be moved to the released position initiates the resetting operation. For example, if electroresponsive device 29 is the first to operate to effect energization of the relay 45, subsequent operation of electroresponsive devices 30 and 31 will be substantially ineffective so far as the operation of the resetting mechanism is concerned. After the lapse of a predetermined time interval established by the relay 46, mechanical bar 48 will be actuated to reset those armature members 34 of the electroresponsive devices which have been moved to the released position. As an additional matter, it is to be noted that each of the control circuits 26, 27 and 28 independently controls electric circuits 7, 8 and 9, respectively. That is, each will effect the energization of trip coil 20 of the associated circuit interrupter if an arc-back condition obtains for a predetermined interval of time irrespective of the condition of the other circuits.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, an electric circuit, a circuit controlling means connected in said circuit, and a control circuit for controlling said controlling means comprising means responsive to a reversal of a predetermined electrical quantity of said electric circuit including a relay having an armature member arranged to be released to initiate an operation for effecting energization of said circuit controlling means, means for completing said operation when said reversal continues for a predetermined time and means for resetting said armature member a predetermined time after said armature member is released.

2. In combination, a plurality of electric conductors, a plurality of electric circuit interrupters each associated with a different one of said electric conductors, a plurality of electroresponsive means each associated with a different predetermined one of said electric conductors and each comprising an armature member adapted to be released upon the reversal of a predetermined electrical condition of the associated electric conductor for initiating an operation to effect control of the associated circuit interrupter, a plurality of time delay relays each associated with a different predetermined one of said electric conductors for completing said operation when said reversal obtains for a predetermined interval of time, and means associated with said electroresponsive devices for resetting the released armature members.

3. In combination, a plurality of electric conductors for conducting current in a predetermined direction, a plurality of electric circuit interrupters each associated with a different one of said electric conductors, a plurality of electroresponsive means each associated with a different predetermined one of said electric conductors and each comprising an armature member adapted to be released upon reversal of the current in the associated conductors for initiating an operation to effect control of the associated circuit interrupter, a plurality of time delay relays each associated with a different predetermined one of said electric conductors for completing said operation when said reversal obtains for a predetermined interval of time, and means associated with each of said electroresponsive devices for resetting the released armature members a predetermined time after the first of said armatures to be released.

4. In combination, an alternating current circuit, a direct current circuit, electric translating apparatus interposed between said circuits including a plurality of electric valve means, a plurality of circuit interrupters each associated with a different predetermined one of said electric valve means, a plurality of control circuits each associated with a different one of said circuit interrupters and each comprising a current responsive means having an armature member adapted to be released to initiate an operation to effect energization of the associated circuit interrupter when the associated electric valve means conducts current in a reverse direction and a time delay relay for effecting completion of said operation when said electric valve means conducts current in the reverse direction for a predetermined number of negative half cycles, and means associated with each of said current responsive means for resetting the released armature members after the lapse of a predetermined time.

5. In combination, an electric circuit, a circuit interrupter connected therein and having a trip coil, a control circuit for said circuit interrupter comprising a device responsive to the reversal of a predetermined electrical quantity of said electric circuit for initiating an operation to effect energization of said trip coil and a time delay relay responsive to said electrical quantity for completing said operation to effect energization of said trip coil only when said reversal of said electrical quantity obtains for a predetermined time, and means for resetting said device a predetermined time after said device initiates said operation.

6. In combination, an electric circuit, an electric valve means connected in said circuit and being arranged to conduct current in a predetermined direction, a circuit interrupter connected in said circuit and having a trip coil, a control circuit for said circuit interrupter comprising a device responsive to the reversal of current through said electric valve means for initiating an operation to effect energization of said trip coil and a time delay relay responsive to the current through said electric valve means for completing said operation to effect energization of said trip coil only when said current obtains for a predetermined time, and means for resetting said device a predetermined time after said device initiates said operation.

7. In combination, an electric circuit, a controlling means associated with said circuit, a control circuit for controlling said controlling means comprising a device responsive to the reversal of a predetermined electrical quantity of said circuit for initiating an operation to effect control of said controlling means and a time delay relay responsive to said electrical condition for completing said operation only when said reversal obtains for a predetermined time, said relay being arranged to interrupt said control circuit immediately after closing said control circuit, and means for resetting said device a predetermined time after said device initiates said operation.

LYSLE W. MORTON.
RICHARD G. LORRAINE.